United States Patent
Kusano

(10) Patent No.: US 8,325,862 B2
(45) Date of Patent: Dec. 4, 2012

(54) WIRELESS COMMUNICATION APPARATUS AND WIRELESS RECEPTION METHOD

(75) Inventor: Yoshimasa Kusano, Yokohama (JP)

(73) Assignee: Kyocera Corporation, Kyoto (JP)

(*) Notice: Subject to any disclaimer, the term of this patent is extended or adjusted under 35 U.S.C. 154(b) by 123 days.

(21) Appl. No.: 12/739,397

(22) PCT Filed: Oct. 22, 2008

(86) PCT No.: PCT/JP2008/069114
§ 371 (c)(1),
(2), (4) Date: Sep. 7, 2010

(87) PCT Pub. No.: WO2009/054399
PCT Pub. Date: Apr. 30, 2009

(65) Prior Publication Data
US 2010/0322362 A1 Dec. 23, 2010

(30) Foreign Application Priority Data
Oct. 23, 2007 (JP) .................................. 2007-275087

(51) Int. Cl.
*H04B 7/10* (2006.01)
*H04L 1/02* (2006.01)

(52) U.S. Cl. ........ 375/347; 375/349; 375/346; 375/267; 375/260; 375/148; 455/500; 455/101; 455/504; 455/506

(58) Field of Classification Search .................. 375/347, 375/349, 346, 267, 260, 148, 144; 455/500, 455/504, 101
See application file for complete search history.

(56) References Cited

U.S. PATENT DOCUMENTS
6,151,487 A 11/2000 Ogawa
(Continued)

FOREIGN PATENT DOCUMENTS
JP 10-163934 6/1998
(Continued)

OTHER PUBLICATIONS
International Search Report for PCT/JP2008/069114, mailed on Jan. 27, 2009, 2 pages.
(Continued)

*Primary Examiner* — Phuong Phu
(74) *Attorney, Agent, or Firm* — Duane Morris LLP; Richard C. Kim

(57) ABSTRACT

A wireless communication apparatus having a plurality of antennas 11-1 to 11-M and for diversity-combining signals received by the antennas 11-1 to 11-M, includes a first combining unit (23, 24) for combining received power of the antennas 11-1 to 11-M based on a first algorithm; a second combining unit (21-1 to 21-M, 22, 23) for combining received power of the antennas 11-1 to 11-M based on a second algorithm, which is different from the first algorithm; a determination unit 15 for determining whether there is a delayed wave based on the received signals; and a control unit 16 for selecting either one of the first combining unit (23, 24) and the second combining unit (21-1 to 21-M, 22, 23) depending on a determination result by the determination unit 15 and controlling a selected combining unit to combine received power of the antennas 11-1 to 11-M. Thus, it is possible to reduce the influence of multipath fading and maintain a constantly stable reception condition even when the number of reception antennas is small.

6 Claims, 8 Drawing Sheets

U.S. PATENT DOCUMENTS

2005/0130616 A1* 6/2005 Khayrallah et al. ....... 455/242.2
2007/0009069 A1 1/2007 Kong

FOREIGN PATENT DOCUMENTS

| JP | 2001-345780 | 12/2001 |
| JP | 2003-501971 | 1/2003 |
| JP | 2005-109910 | 4/2005 |
| JP | 2008-193304 | 8/2008 |
| WO | WO-00/76229 | 12/2000 |
| WO | WO-01/59945 | 8/2001 |
| WO | WO 01-59945 | 8/2001 |
| WO | WO-03-032523 | 4/2003 |
| WO | WO-03/032523 | 4/2003 |
| WO | WO-2004/082182 | 9/2004 |
| WO | WO-2005/043796 | 5/2005 |
| WO | WO-2005-043796 | 5/2005 |

OTHER PUBLICATIONS

Extended European Search Report, EP Application No. 08840807.5, dated Aug. 6, 2012.

EP 08840807 Supplementary European Search Report dated Aug. 6, 2012.

* cited by examiner

WIRELESS COMMUNICATION APPARATUS AND WIRELESS RECEPTION METHOD

CROSS REFERENCE TO RELATED APPLICATION

This application claims priority to and the benefit of Japanese Patent Application No. 2007-275087 filed on Oct. 23, 2007, the entire content of which is incorporated herein by reference.

TECHNICAL FIELD

This invention relates to wireless communication apparatus and wireless reception methods capable of diversity-combining reception signals using a plurality of antennas.

BACKGROUND ART

There is a known mobile wireless communication system, which increases a reception gain using a plurality of antennas to improve the reception performance at a base station or a mobile terminal.

Here, there is a fading as one of factors which cause deterioration of the reception performance. The fading is a phenomenon in which radio signals transmitted from a base station or a mobile terminal arrive through lots of paths due to reflection, refraction and scattering by buildings, vehicles, trees and the like existent between base stations and are rendered to be multipath signals. When such multipath fading occurs, the received power fluctuates at a reception antenna end. Thus, a plurality of antennas is prepared at the reception side to increase the received power, and thereby the influence by multipath fading is reduced.

FIG. 9 is a functional block diagram illustrating a schematic configuration of a main part of a conventional wireless communication apparatus reducing the influence by such multipath fading to increase a reception gain. The wireless communication apparatus is provided with a plurality of antennas 101-1 to 101-M. Arrival signals received by the antennas 101-1 to 101-M are reception-processed and A/D-converted by the corresponding reception units 102-1 to 102-M. Output signals from these reception units 102-1 to 102-M are diversity-combined by a combining circuit 103 so that combined received power is maximum, and thereafter the combined reception signal is equalized by an equalizer 104 and then error-corrected and decoded by a decode circuit 105.

Here, there is known, as an example of methods for combining a plurality of reception signals at the combining circuit 103, a method in which a known information signal inserted in a reception signal is used to calculate, for each antenna, an antenna weight at which the phase error of the received known information signal is a minimum using MMSE (Minimum Mean Square Error), and based on the calculated antenna weights, phase of reception signals from reception units are corrected and the reception signals are combined to obtain a combined reception signal having a sufficiently high SNR (Signal to Noise Ratio) (see Patent Document 1, for example).

In the conventional wireless communication apparatus shown in FIG. 9, the combining circuit 103 performs, prior to combining reception signals from reception units, first equalization for correcting the phase of each reception signal, and then the equalizer 104 performs second equalization on the combined reception signal based on the amplitude of the known information signal. Moreover, the decode circuit 105 performs, using reliability information (combined power) generated in the second equalization of the combined reception signal by the equalizer 104, error correction on the combined reception signal and decodes it, and then outputs the result. The error correction method using such reliability information is disclosed in Patent Document 2, for example.

Moreover, there is also known, as another method for combining signals received by a plurality of antennas, the MRC (Maximum Ratio Combining) in which phases of signals received by antennas are corrected using a known information signal inserted in the reception signals, and the reception signals are weighted and combined according to levels of the respective phase-corrected reception signals so that the combined received power becomes large.

Patent Document 1: JP 2003-501971 T
Patent Document 2: WO 2004/082182

SUMMARY OF INVENTION

Technical Problem

The combining method by MMSE described in the above Patent Document 1, when arrival waves with delays are mixed in a multipath environment and interference waves having time differences relative to a main signal are superposed, suppresses the interference waves to secure the SNR. Therefore, when lots of arrival waves with delays are mixed beyond MMSE's capability of removing interference waves, the SINR (Signal to Interference and Noise Ratio) required for normal reception cannot be secured and thus the dispersion of reception symbols increases. As a result, when the error correction is performed on the combined reception signal, the possibility that correction error occurs is significantly high.

The influence of multipath fading caused by such arrival waves with delays is particularly significant when the number of reception antennas is small. Thus, with respect to the reception apparatus in which it is difficult to provide lots of antennas because of its structure, particularly in the case of a modulation scheme which requires a high SINR such as QAM (Quadrature Amplitude Modulation), lots of arrival waves with delays make it impossible to acquire sufficient signal components due to the influence by the increase of reception symbol dispersion. As a result, the correction cannot be performed properly, leading to the situation in which communication is not established.

In the combining method by MRC, on the other hand, each signal is weighted according to the level of each of the phase-corrected reception signals so that the combined received power becomes large. Thus, when lots of arrival waves with delays are mixed, the SINR required for normal reception can be secured. However, when the number of arrival waves with delays is small or zero, signal components can be acquired more easily with the method of combining reception signals by MMSE than by MRC.

Thus, when a method of combining reception signals is fixed as in the conventional wireless communication apparatus using a plurality of antennas, it becomes difficult to equally stabilize the communication quality in a radio environment in which the condition of reception signals varies constantly.

Therefore, in the view of the above problem, an object of the present invention is to provide a wireless communication apparatus and a wireless reception method capable of reducing the influence of multipath fading, so that a constantly stable reception condition is maintained even when the number of reception antennas is small.

Solution to Problem

In order to achieve the above object, according to a first aspect of the invention, a wireless communication apparatus having a plurality of antennas and for diversity-combining signals received by the plurality of antennas, includes:

a first combining unit for combining received power of the plurality of antennas based on a first algorithm;

a second combining unit for combining received power of the plurality of antennas based on a second algorithm, which is different from the first algorithm;

a determination unit for determining whether there is a delayed wave based on the received signals; and a control unit for selecting either one of the first combining unit and the second combining unit depending on a determination result by the determination unit and controlling a selected combining unit to combine received power of the plurality of antennas.

According to a second aspect of the invention, in the wireless communication apparatus according to the first aspect, the first combining unit, which is adopted when the determination unit determines that there is no delayed wave, weights and combines signals received by the plurality of antennas using a minimum mean square error method, and the second combining unit, which is adopted when the determination unit determines that there is a delayed wave, calculates combining weight ratios based on received power of the plurality of antennas, and based on the calculated combining weight ratios, weights and combines signals received by the plurality of antennas.

According to a third aspect of the invention, in the wireless communication apparatus according to the second aspect, the combining weight ratio is calculated as an antenna reliability ratio for each antenna based on an antenna combined amplitude of received power of the plurality of antennas and an amplitude of received power of each antenna, and signals received by respective antennas are weighted based on corresponding antenna reliability ratios, respectively, and combined.

According to a fourth aspect of the invention, in the wireless communication apparatus according to the first aspect, signals received by the plurality of antennas to be combined by the first combining unit and the second combining unit are Orthogonal Frequency-Division Multiplexed (OFDM) reception signals.

According to a fifth aspect of the invention, in the wireless communication apparatus according to the first aspect, the determination unit includes a calculation unit for calculating an impulse sequence by performing discrete Fourier transform on respective signals received by the plurality of antennas, and determines whether there is a delayed wave based on a gain ratio between a main arrival wave and an arrival wave with a delay and a time difference between the main arrival wave and a last arrival wave with a delay in the impulse sequence calculated by the calculation unit.

According to a sixth aspect of the invention, in the wireless communication apparatus according to the fifth aspect, the determination unit determines that there is no delayed wave when the gain ratio and the time difference in the impulse sequence calculated by the calculation unit are less than corresponding thresholds, respectively, and the determination unit determines that there is a delayed wave when at least one of the gain ratio and the time difference is equal to or more than the corresponding threshold.

Furthermore, in order to achieve the above object, according to a seventh aspect of the invention, a wireless reception method for diversity-combining signals received by a plurality of antennas, includes:

combining received power of the plurality of antennas based on a first algorithm or a second algorithm depending on whether there is a delayed wave, wherein the second algorithm is different from the first algorithm.

Advantageous Effects on Invention

According to the present invention, received power of a plurality of antenna is combined based on a different algorithm depending on whether there is a delayed wave, so that the received power can be combined by the algorithm suitable for the existence or non-existence of delayed waves. Therefore, it is possible to reduce the influence of multipath fading and thus maintain a constantly stable reception condition.

Figure 1:
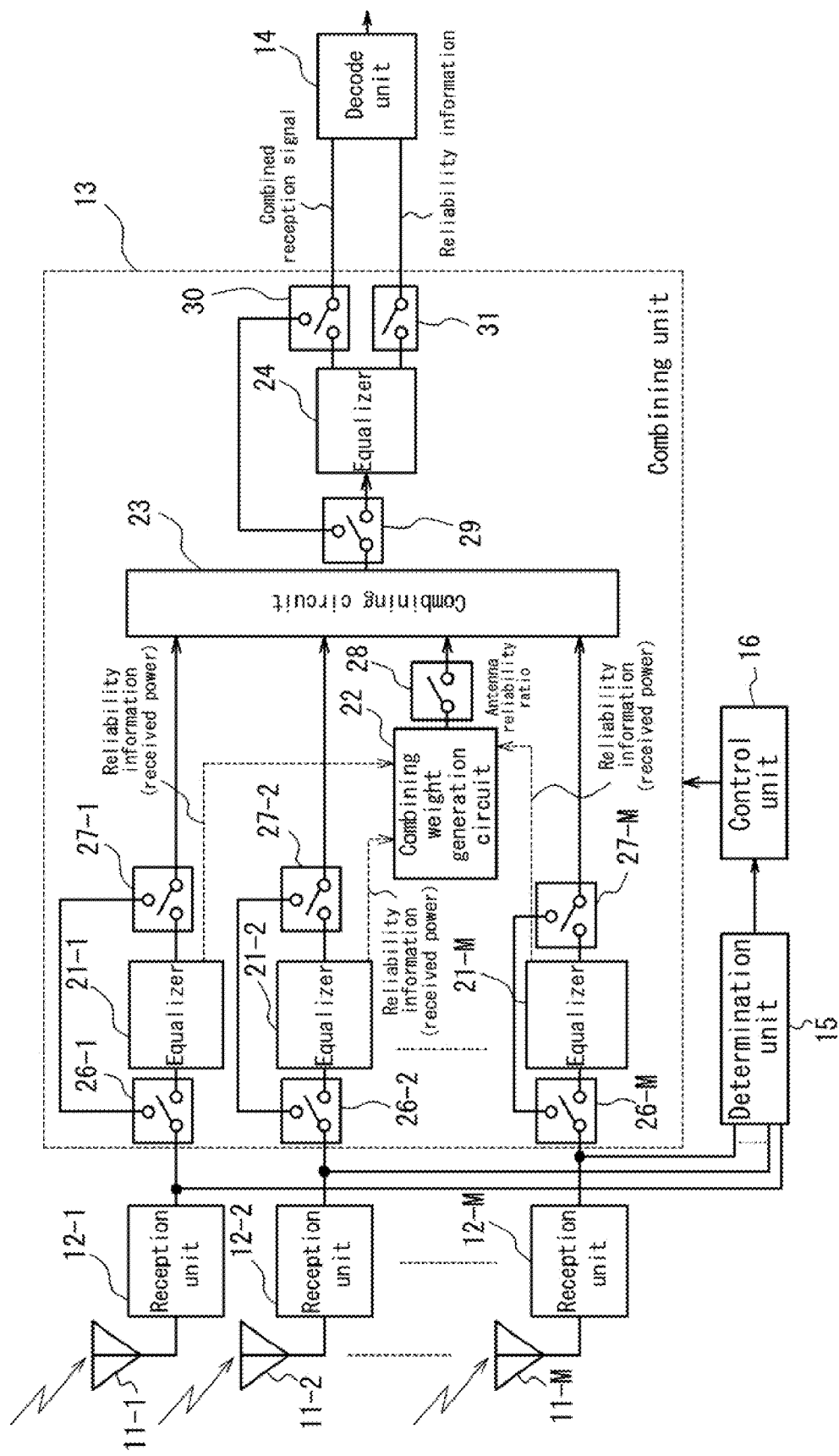
FIG. 1 is a functional block diagram illustrating a schematic configuration of a main part of a wireless communication apparatus according to an embodiment of the present invention.

REFERENCE SYMBOLS 11-1 to 11-M antenna
12-1 to 12-M reception unit
13 combining unit
14 decode unit
15 determination unit
16 control unit
21-1 to 21-M equalizer
22 combining weight generation circuit
23 combining circuit
24 equalizer
26-1 to 26-M switch
27-1 to 27-M switch
28 ON/OFF switch
29 switch
30 switch
31 ON/OFF switch
41-1 to 41-M discrete Fourier transform (DFT) circuit
42 impulse response detection circuit
43 determination circuit

DESCRIPTION OF EMBODIMENTS

Embodiments of the present invention will be described with reference to the accompanying drawings.

FIG. 1 is a functional block diagram illustrating a schematic configuration of a main part of a wireless communication apparatus according to an embodiment of the present invention. This wireless communication apparatus is provided with a plurality of antennas 11-1 to 11-M, reception units 12-1 to 12-M for processing signals received by the antennas 11-1 to 11-M, a combining unit 13 for diversity-combining outputs from the reception units 12-1 to 12-M, a decode unit 14 for decoding the combined reception signal, a determination unit 15 for determining whether there is a delayed wave based on outputs from the reception units 12-1 to 12-M and a control unit 16 for controlling combining processing by the combining unit 13 depending on a determination result by the determination unit 15.

Figure 9:
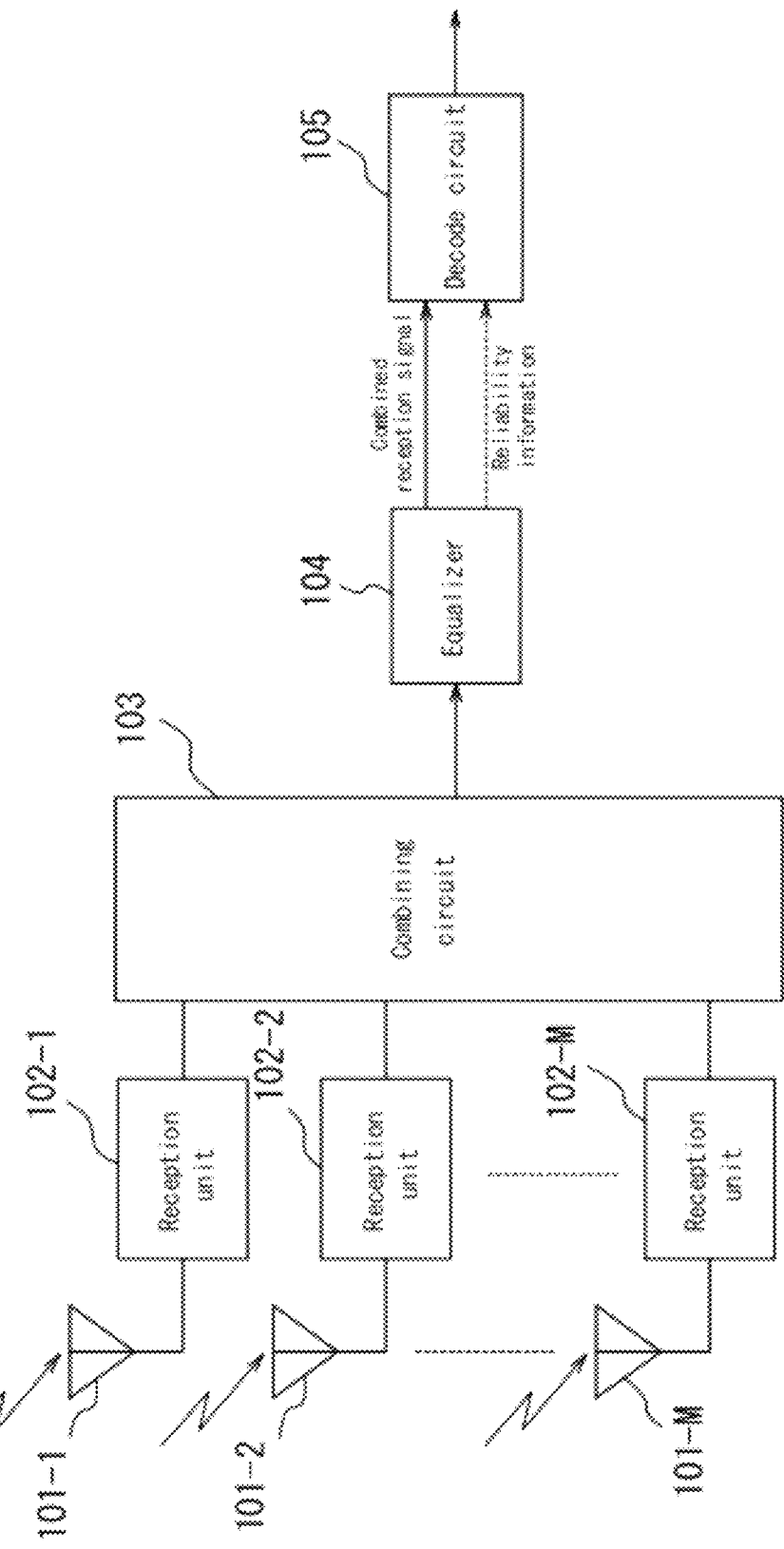
FIG. 9 is a functional block diagram illustrating a schematic configuration of a main part of a conventional wireless communication apparatus.

In the wireless communication apparatus according to the present embodiment, the control unit 16 controls the combining unit 13 to combine the outputs from the reception units 12-1 to 12-M according to a different algorithm depending on the determination result by the determination unit 15 for determining whether there is a delayed wave. Specifically, when the determination unit 15 determines that there is no delayed wave, the combining is performed according to, as a first algorithm, the known MMSE described with FIG. 9 and, when the determination unit 15 determines that there is a delayed wave, the combining is performed according to a second algorithm other than MMSE.

Here, as the second algorithm, the above known MRC can be employed. In the wireless communication apparatus according to the present embodiment, however, the antenna reliability ratio for each antenna is calculated based on the antenna combined amplitude depending on the received power of the reception units 12-1 to 12-M corresponding to the antennas 11-1 to 11-M, respectively, and the amplitude of the received power of the reception unit corresponding to each antenna. Then, the reception signals of the reception units corresponding to antennas, respectively, are weighted based on the corresponding antenna reliability ratios and combined to generate a combined reception signal.

Thus, the combining unit 13 is provided with equalizers 21-1 to 21-M corresponding to the reception units 12-1 to 12-M, respectively, a combining weight generation circuit 22, a combining circuit 23 and an equalizer 24. The combining unit 13 is further provided with input-side switches 26-1 to 26-M and output-side switches 27-1 to 27-M for bypassing the equalizers 21-1 to 21-M, an ON/OFF switch 28 connecting/disconnecting the antenna reliability ratio output line of the combining weight generation circuit 22 to the combining circuit 23, an input-side switch 29 and an output-side switch 30 for bypassing the equalizer 24 and an ON/OFF switch 31 connecting/disconnecting the reliability information output line of the equalizer 24 to the decode unit 14.

Figure 2:
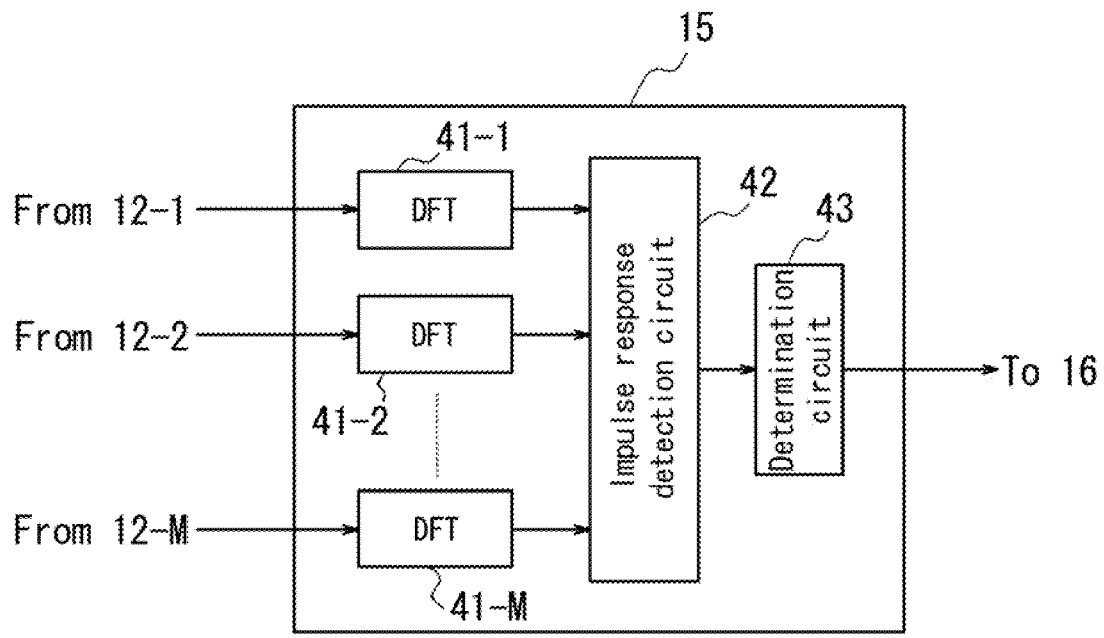
FIG. 2 is a functional block diagram illustrating a schematic configuration of a determination unit shown in FIG. 1.

Moreover, the determination unit 15 is provided, as shown in the functional block diagram in FIG. 2, with DFT (Discrete Fourier Transform) circuits 41-1 to 41-M for performing discrete Fourier transform on outputs of the reception units 12-1 to 12-M, respectively, an impulse response detection circuit 42 for calculating an impulse sequence of reception signals based on outputs from the DFT circuits 41-1 to 41-M and a determination circuit 43 for determining whether there is a delayed wave based on the output from the impulse response detection circuit 42.

The determination circuit 43 calculates, based on the impulse sequence obtained from the impulse response detection circuit 42, gain ratios between a main arrival wave which arrives first and respective arrival waves with delays which arrive subsequently, and a time difference between the main arrival wave and the last arrival wave with a delay, and determines whether there is a delayed wave based on the gain ratios and the time difference, and then outputs the result to the control unit 16 shown in FIG. 1.

Figure 3:
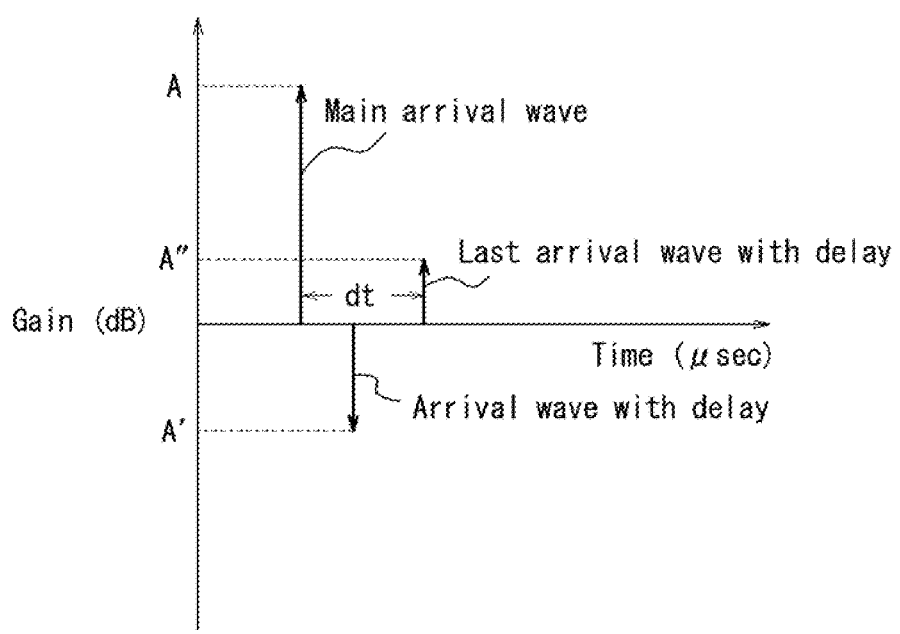
FIG. 3 is a diagram exemplifying an impulse sequence calculated by an impulse response detection circuit shown in FIG. 2.

For example, when the impulse response detection circuit 42 calculates an impulse sequence having a main arrival wave of a gain A, an arrival wave with a delay of a gain A' and a last arrival wave with a delay of a gain A" which arrives with a time difference dt after the main arrival wave, as shown in FIG. 3, the determination circuit 43 calculates gain ratios A'/A and A"/A between the main arrival wave and the respective arrival waves with delays, and compares those gain ratios with a given threshold C as well as comparing the time difference dt with a threshold T. As a result, the determination circuit 43 determines that "there is no delayed wave" in the case of A'/A<C, A"/A<C and dt<T, and that "there is a delayed wave" in the cases that at least one gain ratio is equal to or more than the threshold C or that the time difference dt is equal to or more than the threshold T. The threshold C of the gain ratio and the threshold T of the time difference are appropriately set based on a simulation result of Frame Error Rate (FER) characteristic and the like.

Therefore, in the present embodiment, the determination unit 15 constitutes a calculation unit by including the DFT circuits 41-1 to 41-M and the impulse response detection circuit 42.

In FIG. 1, when the determination result of the determination unit 15 is that "there is no delayed wave", the control unit 16 controls the switches 26-1 to 26-M and the switches 27-1 to 27-M so that the outputs from the reception units 12-1 to 12-M are provided directly to the combining circuit 23 with bypassing the equalizers 21-1 to 21-M, and turns off the ON/OFF switch 28 to block the antenna reliability ratio output line from the combining weight generation circuit 22 to the combining circuit 23. Furthermore, the control unit 16 controls the switch 29 and the switch 30 so that the output from the combining circuit 23 is provided to the decode unit 14 via the equalizer 24, and turns on the ON/OFF switch 31 so that the reliability information is provided from the equalizer 24 to the decode unit 14. Thus, the combining circuit 23 generates a combined reception signal based on MMSE.

When the determination result from the determination unit 15 is that "there is a delayed wave", on the contrary, the control unit 16 controls the switches 26-1 to 26-M and the switches 27-1 to 27-M so that the outputs from the reception units 12-1 to 12-M are provided to the combining circuit 23 via the corresponding equalizers 21-1 to 21-M, and also controls the switch 29 and the switch 30 so that the output from the combining circuit 23 is provided to the decode unit 14 with bypassing the equalizer 24. Furthermore, the control unit 16 turns on the ON/OFF switch 28 so that the antenna reliability ratio is provided from the combining weight generation circuit 22 to the combining circuit 23, and turns off the ON/OFF switch 31 to block the reliability information output line from the equalizer 24 to the decode unit 14. Thus, the combining circuit 23 generates a combined reception signal based on the antenna reliability ratio.

Figure 4:
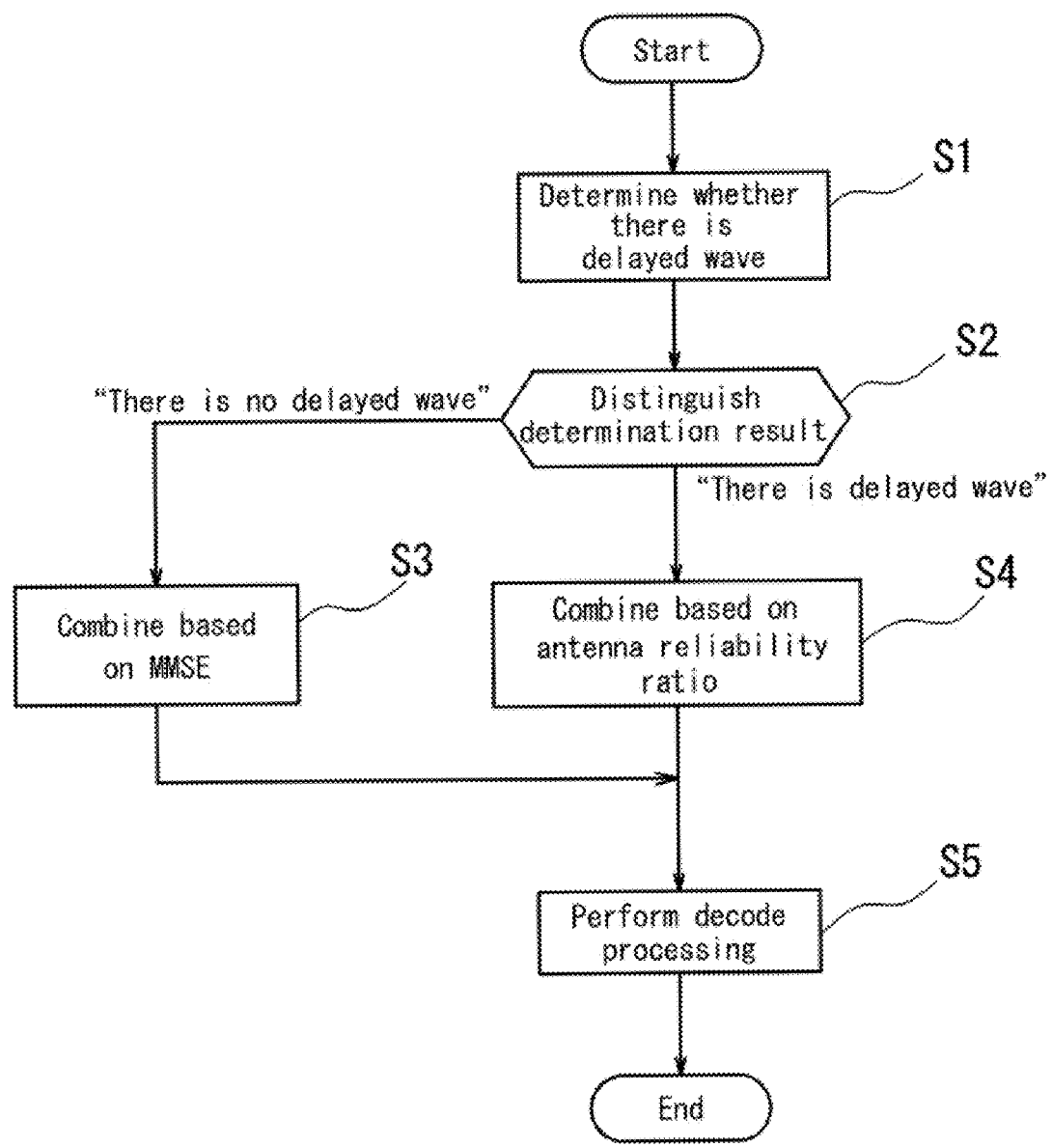
FIG. 4 is a schematic flowchart illustrating reception operation by the wireless communication apparatus shown in FIG. 1.

FIG. 4 is a schematic flowchart illustrating reception operation by the wireless communication apparatus in accordance with the present embodiment. First, the determination unit 15 determines whether there is a delayed wave based on the outputs from the reception units 12-1 to 12-M, as described above, and provides the result to the control unit 16 (Step S1). The control unit 16 distinguishes the determination result from the determination unit 15 (Step S2) and, as a result, controls the combining unit 13 to generate a combined reception signal based on MMSE when "there is no delayed wave" (Step S3). The control unit 16 controls the combining unit 13 to generate a combined reception signal based on the antenna reliability ratio when "there is a delayed wave" (Step S4). Thereafter, the decode unit 14 performs decode processing on the combined reception signal generated at Step S3 or Step S4 to error-correct and decode the combined reception signal (Step S5).

Figure 5:
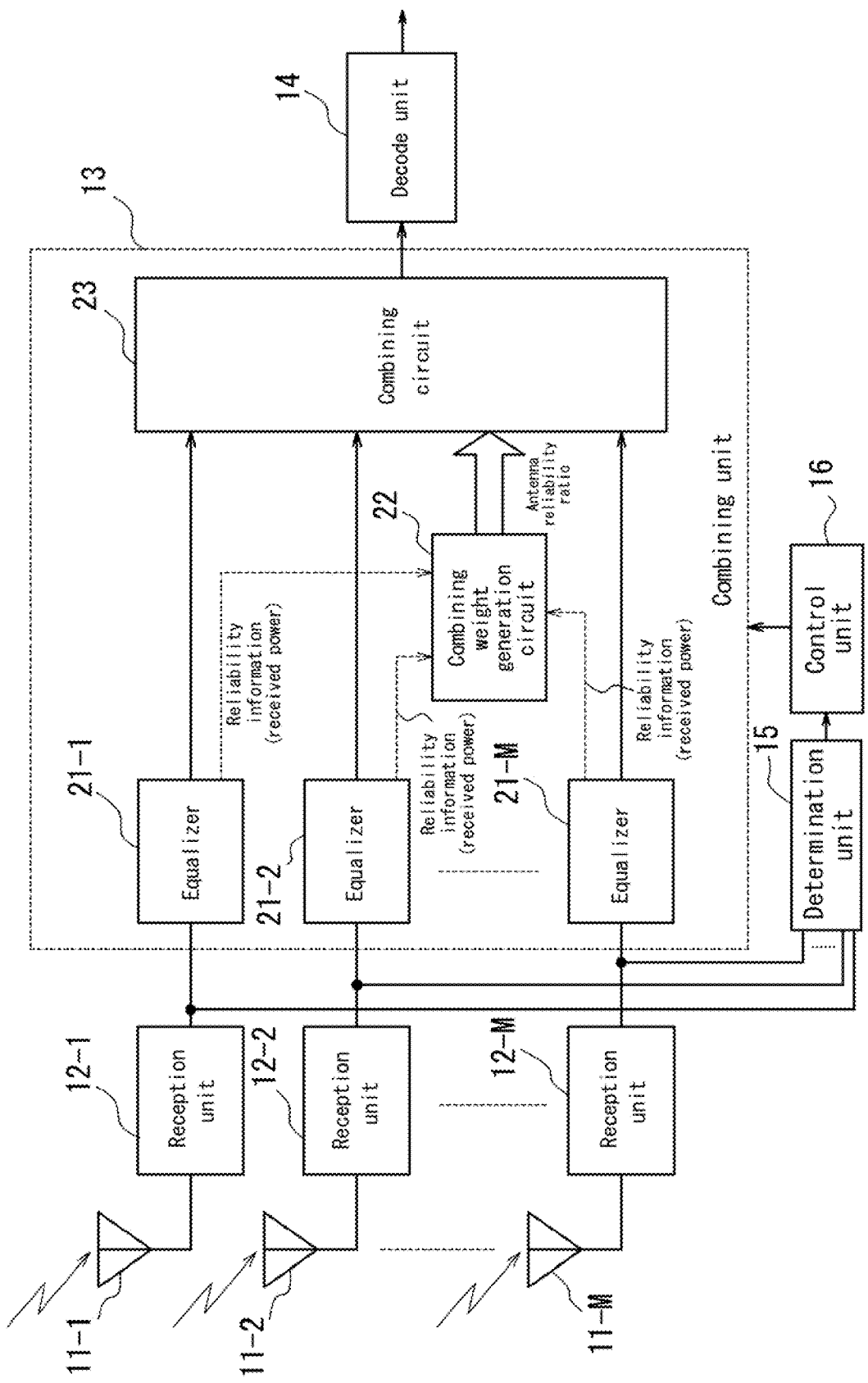
FIG. 5 is a functional block diagram illustrating a configuration of the combining unit shown in FIG. 1 when "there is a delayed wave"

Next, there will be described the combining processing based on the antenna reliability ratio when "there is a delayed wave". In this case, the combining unit 13 is configured as shown in FIG. 5 by the control unit 16 so that arrival signals received by the antennas 11-1 to 11-M are reception-processed and A/D converted by the corresponding reception units 12-1 to 12-M, respectively, and output signals from such reception units 12-1 to 12-M are provided to the corresponding equalizers 21-1 to 21-M, respectively, in the combining unit 13.

Here, with respect to arrival signals received by the antennas 11-1 to 11-M, their amplitude and phase are varying due to the influence of multipath environment in radio space. In the wireless communication apparatus according to the present embodiment, the outputs from the reception units 12-1 to 12-M are provided to the corresponding equalizers 21-1 to 21-M, respectively, and thereby channel estimation and equalization compensation compensating the variations in the amplitude and phase of arrival signals are conducted independently for each reception path using a known signal such as training sequence or pilot symbols inserted in the arrival signals so as to generate reliability information (received power) for each antenna and a reception signal after equalization compensation for each antenna.

The equalizers 21-1 to 21-M provide the generated reliability information of respective antennas to the combining weight generation circuit 22 and provide the reception signals after equalization compensation to the combining circuit 23. The combining weight generation circuit 22 calculates the antenna combined amplitude based on the input reliability information of each antenna. Next, the combining weight generation circuit 22 calculates the antenna reliability ratio for each antenna based on the calculated antenna combined amplitude and the reliability information for each antenna, and provides the calculated antenna reliability ratio for each antenna as the combining weight ratio to the combining circuit 23.

The combining circuit 23 weights the reception signals after equalization compensation from the equalizers 21-1 to 21-M based on the antenna reliability ratios (combining weight ratios) of respective antennas from the combining weight generation circuit 22 and combines them to generate a combined reception signal. Next, the combining circuit 23 provides the combined reception signal to the decode unit 14 with bypassing the equalizer 24. The decode unit 14 error-corrects and decodes the combined reception signal provided from the combining circuit 23, and outputs the result.

The combining processing in the case that "there is a delayed wave" will be described in more detail with an example in which wireless communication of a multicarrier modulation system is performed using the OFDM (Orthogonal Frequency Division Multiplexing) scheme as a communication scheme.

Figure 6:
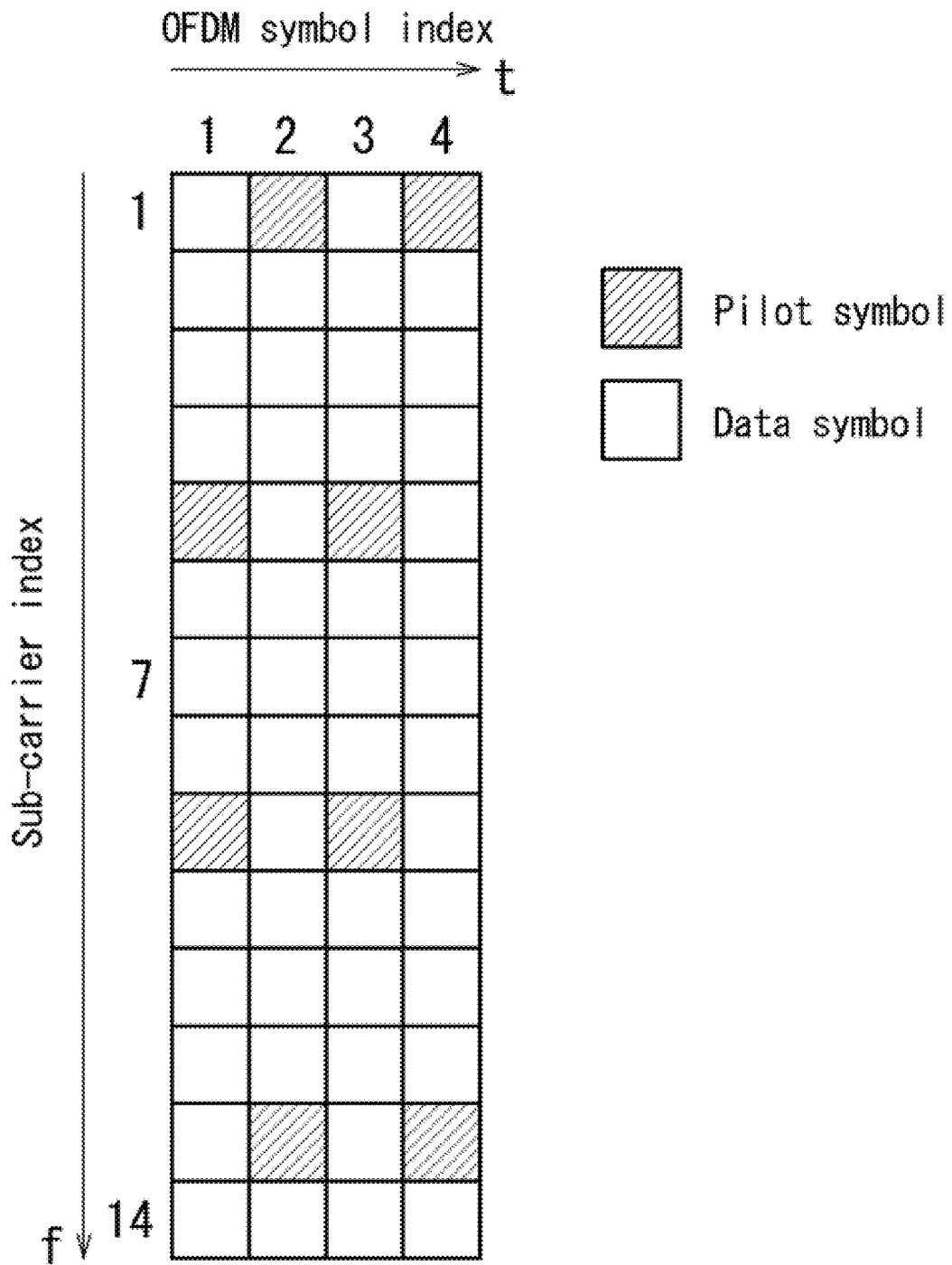
FIG. 6 is a diagram exemplifying a pilot arrangement in the OFDM scheme to explain an exemplary operation of the wireless communication apparatus shown in FIG. 1.

FIG. 6 is a diagram exemplifying a pilot arrangement in the OFDM scheme. This example shows a case in which, with respect to symbols of 14×4 having 14 symbols in a direction of frequency axis (f) (that is, 14 subcarriers) and 4 symbols in a direction of time axis (t), pilots are assigned respectively in OFDM symbol index 2, 4 with sub-carrier index 1, 13 and OFDM symbol index 1, 3 with sub-carrier index 5, 9.

In the wireless communication apparatus according to the present embodiment, the channel characteristics of pilots are estimated first at the equalizers 21-1 to 21-M. Thereafter, the estimated channel characteristics are interpolated in data symbols in the direction of time axis, and the channel characteristics are interpolated in data symbols in the direction of frequency axis using the interpolated channel characteristics and channel characteristics of pilots in the direction of frequency axis.

Thus, the equalizers 21-1 to 21-M extract the pilots first and estimate (calculate) the transmission channel characteristics of the extracted pilots using the following expression (1).

$$H_{f,t}(a) = \frac{C_{f,t}(a)}{A_{f,t}(a)} \ (0 < a < N_A) \quad (1)$$

f: sub-carrier index in which pilot is existent
t: OFDM symbol index in which pilot is existent
a: antenna index
$N_A$: the number of antennas In the above expression (1), frequency response information $C_{f,t}$ (a) and $A_{f,t}$ (a) is calculated using the following expression (2).

$$\begin{cases} C_{f,t}(a) = x_{f,t}(a) r^*_{f,t} \\ A_{f,t}(a) = x_{f,t}(a) x^*_{f,t}(a) \end{cases} \quad (2)$$

$x_{f,t}$: complex input signal at (f,t) in antenna a.
$r_{f,t}$: reference signal at (f,t)
*: complex conjugate After the channel characteristics of respective pilots are estimated as above, the equalizers 21-1 to 21-M perform, using channel characteristics of pilots arranged sequentially in the direction of time axis, linear interpolation on the channel characteristics of data symbols in the direction of time axis by the following expression (3).

$$Hd_{f,m}(a) = \left(1 - \frac{m}{N_T}\right) H_{f,t-1}(a) + \frac{m}{N_T} H_{f,t}(a) \ (t-1 < m < t) \quad (3)$$

$N_T$: OFDM symbol interval between adjacent pilots

Thereafter, the equalizers 21-1 to 21-M perform, using the channel characteristics of pilots estimated in the direction of time axis and the channel characteristics interpolated in data symbols, linear interpolation on the channel characteristics of data symbols in the direction of frequency axis by the following expression (4).

Frequency ascending linear interpolation $$Hd_{n,t}(a) = \left(1 - \frac{n}{N_F}\right) H_{f-1,t}(a) + \frac{n}{N_F} H_{f,t}(a) \ (f-1 < n < f) \quad (4)$$

$N_F$: sub-carrier interval between adjacent pilots

After the channel characteristics of respective data symbols are estimated as above, the equalizers 21-1 to 21-M perform, using the estimated results, channel equalization on the reception signal of data symbols by the following expression (5), and provide the results to the combining circuit 23.

$$y_{f,t}(a) = x_{f,t}(a) \cdot H^*_{f,t}(a) \quad (5)$$

Moreover, the equalizers 21-1 to 21-M calculate received power as reliability information for each symbol of the corresponding antenna using the following expression (6), and provide the results to the combining weight generation circuit 22.

$$Env_{f,t}(a) = HI_{f,t}^2(a) + HQ_{f,t}^2(a) \quad (6)$$

$HI_{f,t}(a)$: I component of Channel characteristic at (f,t) of antenna a
$HQ_{f,t}(a)$: Q component of Channel characteristic at (f,t) of antenna a The combining weight generation circuit 22 calculates an antenna combined amplitude based on reliability information (received power) of each antenna from the equalizers 21-1 to 21-M using the following expression (7). Based on the calculated antenna combined amplitude and amplitude of received power of each antenna, the combining weight generation circuit 22 calculates an antenna reliability ratio for each antenna as the combining weight ratio using the following expression (8), and thereafter provides the calculated antenna reliability ratio for each antenna to the combining circuit 23.

$$TotalAmp = \sum_{a=0}^{N_A} \sqrt{Env_{f,t}(a)} \quad (7)$$

$$RateEnv_{f,t}(a) = \frac{1}{TotalAmp \cdot \sqrt{Env_{f,t}(a)}} \quad (8)$$

The combining circuit 23 weights the reception signals after equalization compensation from the equalizers 21-1 to 21-M shown in the above expression (5) using the antenna reliability ratios of the corresponding antennas from the combining weight generation circuit 22 shown in the above expression (8) through the following expression (9), and diversity-combines them to generate a combined reception signal. Next, the combining circuit 23 provides the combined reception signal generated to the decode unit 14. The decode unit 14 error-corrects the combined reception signal provided from the combining circuit 23 and decodes it.

$$y_{f,t} = \sum_{a=0}^{N_A} x_{f,t}(a) \cdot H_{f,t}^*(a) \cdot RateEnv_{f,t}(a) \quad (9)$$

Figure 7:
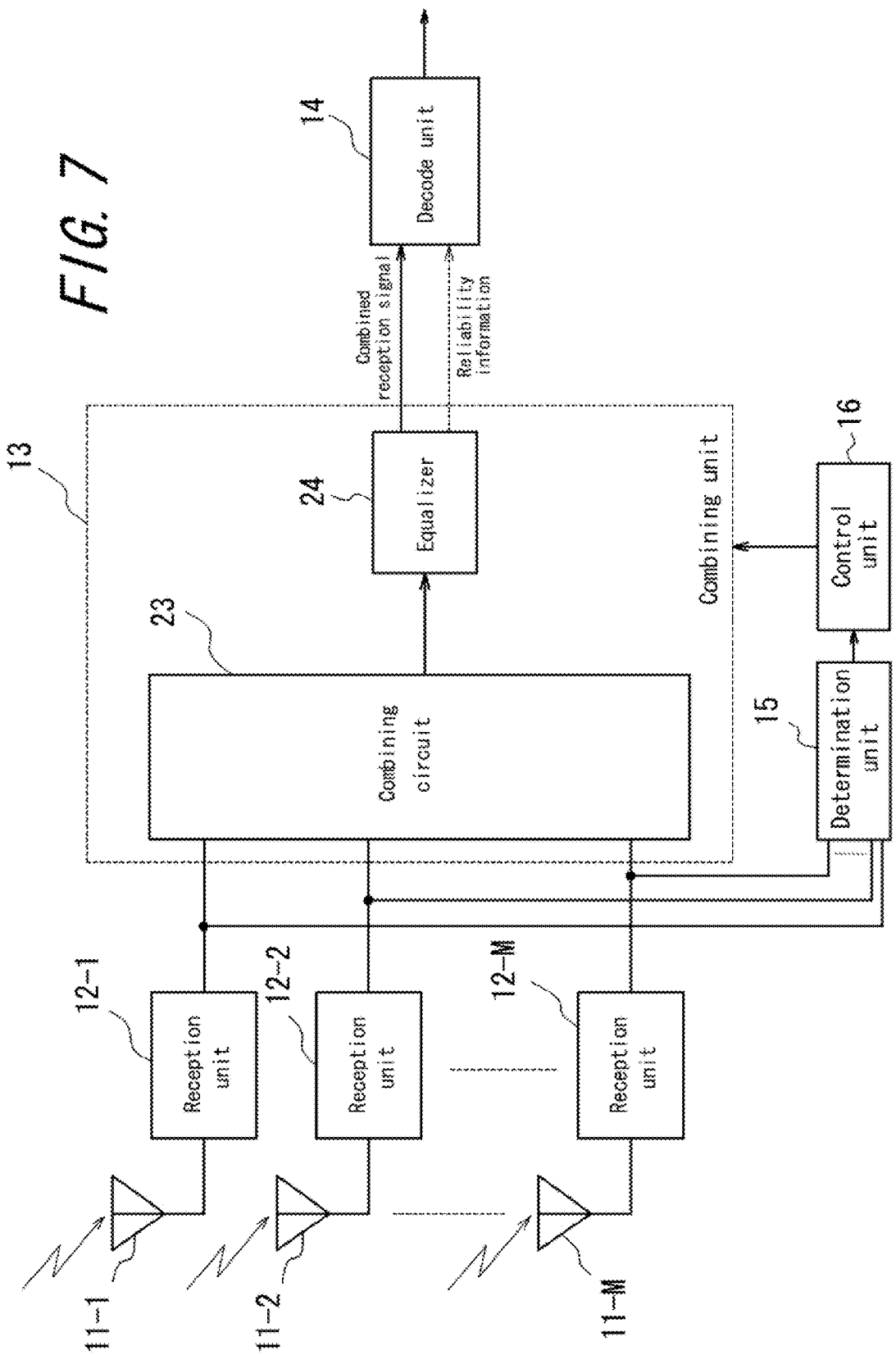
FIG. 7 is a functional block diagram illustrating a configuration of the combining unit shown in FIG. 1 when "there is no delayed wave"

Next, there will be described the combining processing by MMSE when "there is no delayed wave". In this case, the combining unit 13 is configured as shown in FIG. 7 by the control unit 16. In the wireless communication apparatus, in the same manner as the description for FIG. 9, arrival signals received by the antennas 11-1 to 11-M are reception-processed and A/D converted by the corresponding reception units 12-1 to 12-M. Output signals from the reception units 12-1 to 12-M are input to the combining circuit 23. The combining circuit 23 performs, on the signals input from the reception units 12-1 to 12-M, the first equalization for correcting the phase using a known signal such as training sequence or pilot symbols inserted in the arrival signals, and diversity-combines them based on MMSE so that the combined received power is maximum to generate a combined reception signal.

Thereafter, the combining unit 13 performs with the equalizer 24 the second equalization on the combined reception signal based on the amplitude of a known information signal and provides it to the decode unit 14. The decode unit 14 performs error correction on the combined reception signal using reliability information (combined power), which is generated in the second equalization processing for the combined reception signal by the equalizer 24, and outputs a decode result.

In the present embodiment, therefore, the first combining unit is constituted including the combining circuit 23 and the equalizer 24, and the second combining unit is constituted including the equalizers 21-1 to 21-M, the combining weight generation circuit 22 and the combining circuit 23.

Figure 8:
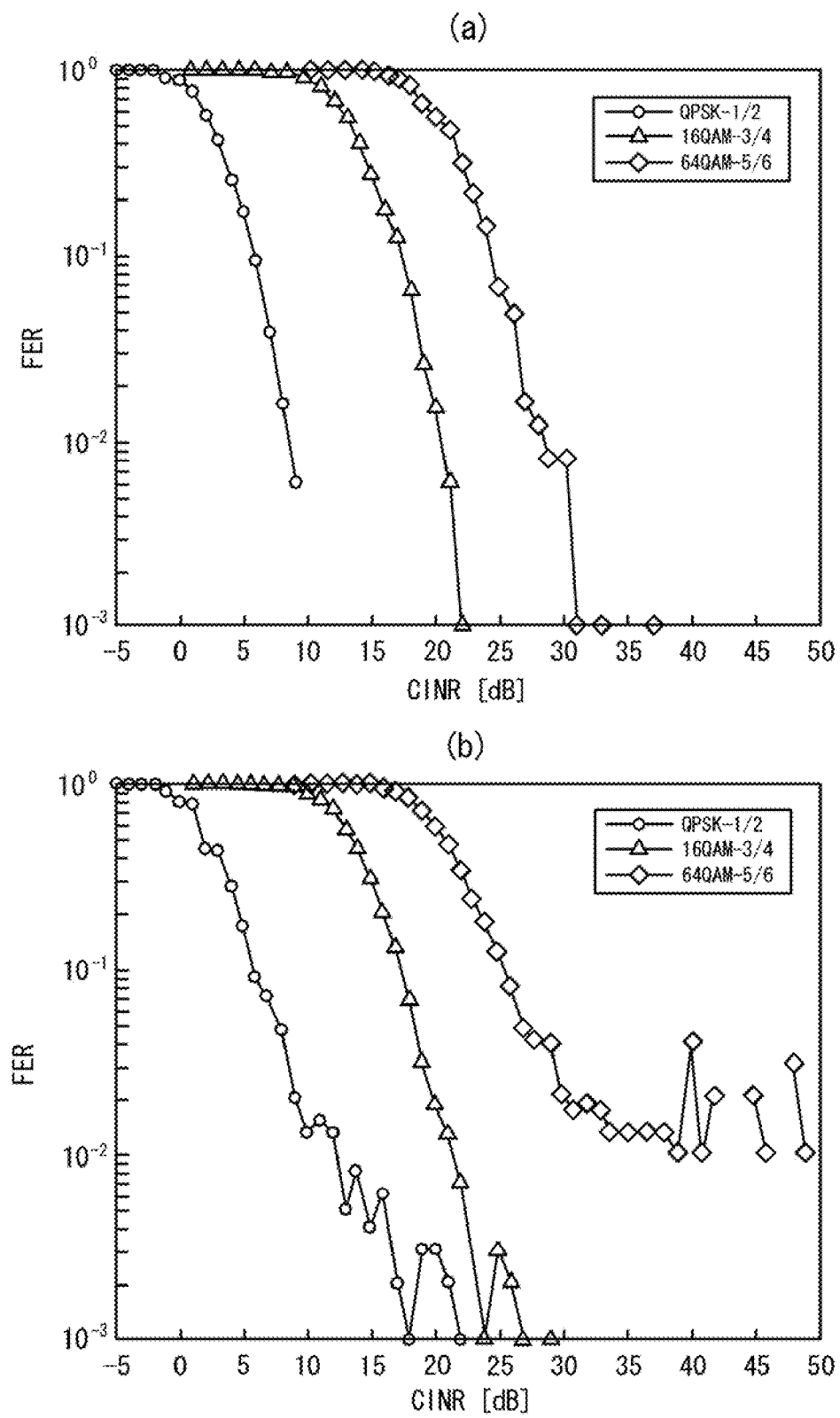
FIG. 8 is a diagram illustrating by comparison a simulation result of FER characteristic of a combined reception signal generated by the wireless communication apparatus shown in FIG. 1 using different combining methods.

FIG. 8 illustrates a simulation result of FER characteristics when the wireless communication apparatus according to the present embodiment generates a combined reception signal and performs decode processing thereon. FIG. 8(*a*) illustrates a simulation result when a combined reception signal is generated based on the antenna reliability ratio, and FIG. 8(*b*) illustrates a simulation result when a combined reception signal is generated based on MMSE. The simulation conditions are such that the number of reception antennas is two and Vehicular-A defined by ITU-R M. 1225 is used as a delay model. The delay time by this delay model, that is, the time difference dt between the main arrival wave and the last arrival wave with a delay is about 2.4 μsec. Moreover, the vehicular speed is 120 (km/h). The OFDM scheme is used as a communication scheme, and FER characteristics according to modulation schemes of QPSK, 16QAM and 64QAM are simulated. The code rates of QPSK, 16QAM and 64QAM are set to be ½, ¾ and ⅚, respectively.

As is clear from FIG. 8, when the time difference dt is as much as about 2.4 μsec, the deterioration of FER characteristics is significant in case of using MMSE shown in FIG. 8(*b*), particularly in modulation schemes of 16QAM and 64QAM requiring a high SINR. In case of using the antenna reliability ratio shown in FIG. 8(*a*), on the contrary, the stable reception condition can be maintained. Therefore, when the time difference dt is 2.4 μsec, the threshold T of the time difference dt is set to generate a combined reception signal based on the antenna reliability ratio.

As above, in the wireless communication apparatus according to the present embodiment, when the determination unit 15 determines that "there is a delayed wave", the combining weight generation circuit 22 calculates the antenna reliability ratio for each antenna as the combining weight ratio based on received power corresponding to each of a plurality of antennas 11-1 to 11-M, namely envelope information. Based on the calculated reliability ratios for respective antennas, the combining circuit 23 weights corresponding signals received by the antennas 11-1 to 11-M and diversity-combines them. Thus, it is possible to reduce the influence of multipath fading caused by arrival waves with delays and maintain the stable reception condition even when the number of reception antennas is small.

Moreover, when the determination unit 15 determines that "there is no delayed wave", the signals received by the antennas 11-1 to 11-M are weighted and diversity-combined based on MMSE. Thereby, the noise removing effects by MMSE makes it possible to obtain a constant SNR value and maintain the stable reception condition.

It is noted that the present invention is not limited to the above embodiment, and many variations and modifications can be implemented. For example, when a combined reception signal is generated based on the antenna reliability ratio in the above embodiment, the antenna combined amplitude calculated by the combining weight generation circuit 22 is used for determination of the symbol position at the decode unit 14 to perform the decode processing. Thus, the fading durability of decode processing can be further improved. Moreover, when a combined reception signal is generated based on MMSE, the antenna combined amplitude is calculated and provided to the decode unit 14, for example, and thereby the decode unit 14 can correct the reliability from the equalizer 24 and then perform the decode processing. In this case, the fading durability of decode processing can be further improved.

Furthermore, a first algorithm combining signals received by a plurality of antennas is not limited to MMSE, and other known algorithms can be applied. Similarly, a second algorithm is also not limited to the above method in which the antenna reliability ratio is calculated to combine the signals, and other known algorithms; the known MRC, for example, can be applied to combine them. Moreover, the present invention can be applied to a wireless communication apparatus employing an adaptive modulation scheme switching a modulation scheme according to a radio condition and, in this case, it is also possible to set a threshold C of gain ratios between a main arrival wave and respective arrival waves with delays and a threshold T of a time difference between a main arrival wave and a last arrival wave with a delay. In addition, the present invention can be applied not only to a multicarrier modulation scheme such as OFDM scheme but also to wide range of wireless communication apparatuses diversity-combining signals received by a plurality of antennas.

The invention claimed is:

1. A wireless communication apparatus having a plurality of antennas and for diversity-combining signals received by the plurality of antennas, comprising:
 a first combining unit for combining received power of the plurality of antennas based on a first algorithm;
 a second combining unit for combining received power of the plurality of antennas based on a second algorithm, which is different from the first algorithm;
 a determination unit for determining whether there is a delayed wave based on the received signals; and
 a control unit for selecting either one of the first combining unit and the second combining unit depending on a determination result by the determination unit and controlling a selected combining unit to combine received power of the plurality of antennas.

2. The wireless communication apparatus according to claim 1, wherein the first combining unit, which is adopted when the determination unit determines that there is no delayed wave, weights and combines signals received by the plurality of antennas using a minimum mean square error method, and
 the second combining unit, which is adopted when the determination unit determines that there is a delayed wave, calculates combining weight ratios based on received power of the plurality of antennas, and based on the calculated combining weight ratios, weights and combines signals received by the plurality of antennas.

3. The wireless communication apparatus according to claim 2, wherein the combining weight ratio is calculated as an antenna reliability ratio for each antenna based on an antenna combined amplitude of received power of the plurality of antennas and an amplitude of received power of each antenna, and signals received by respective antennas are weighted based on corresponding antenna reliability ratios, respectively, and combined.

4. The wireless communication apparatus according to claim 1, wherein signals received by the plurality of antennas to be combined by the first combining unit and the second combining unit are Orthogonal Frequency-Division Multiplexed (OFDM) reception signals.

5. The wireless communication apparatus according to claim 1, wherein
 the determination unit comprises a calculation unit for calculating an impulse sequence by performing discrete Fourier transform on respective signals received by the plurality of antennas, and
 determines whether there is a delayed wave based on a gain ratio between a main arrival wave and an arrival wave with a delay and a time difference between the main arrival wave and a last arrival wave with a delay in the impulse sequence calculated by the calculation unit.

6. The wireless communication apparatus according to claim 5, wherein
 the determination unit determines that there is no delayed wave when the gain ratio and the time difference in the impulse sequence calculated by the calculation unit are less than corresponding thresholds, respectively, and
 determines that there is a delayed wave when at least one of the gain ratio and the time difference is equal to or more than the corresponding threshold.

\* \* \* \* \*